UNITED STATES PATENT OFFICE.

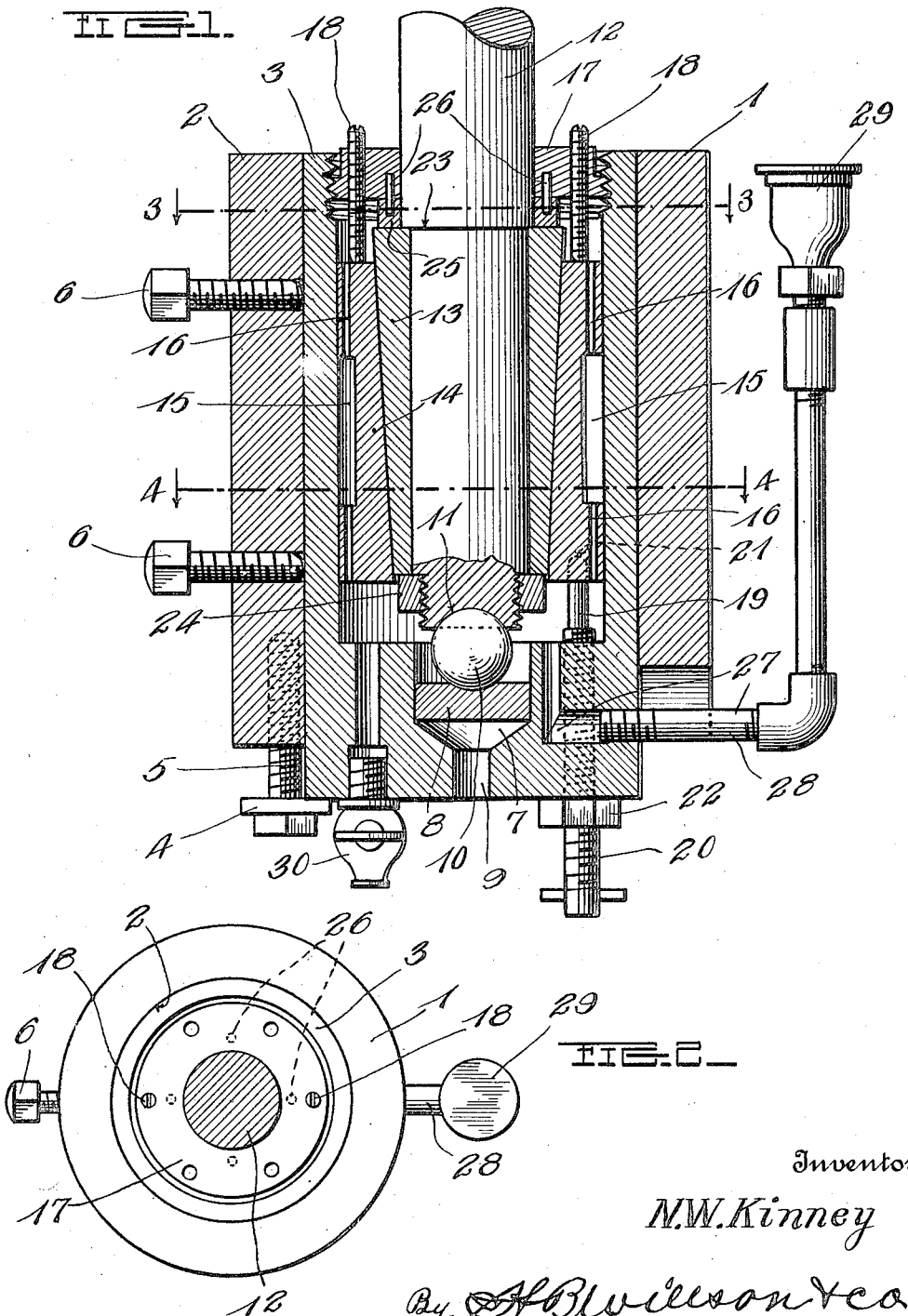
N. W. KINNEY.
SELF OILING METAL BEARING.
APPLICATION FILED JUNE 19, 1919.
1,346,377.
Patented July 13, 1920.
2 SHEETS—SHEET 1.
Inventor
N.W. Kinney
By H.B. Willson & Co
Attorneys

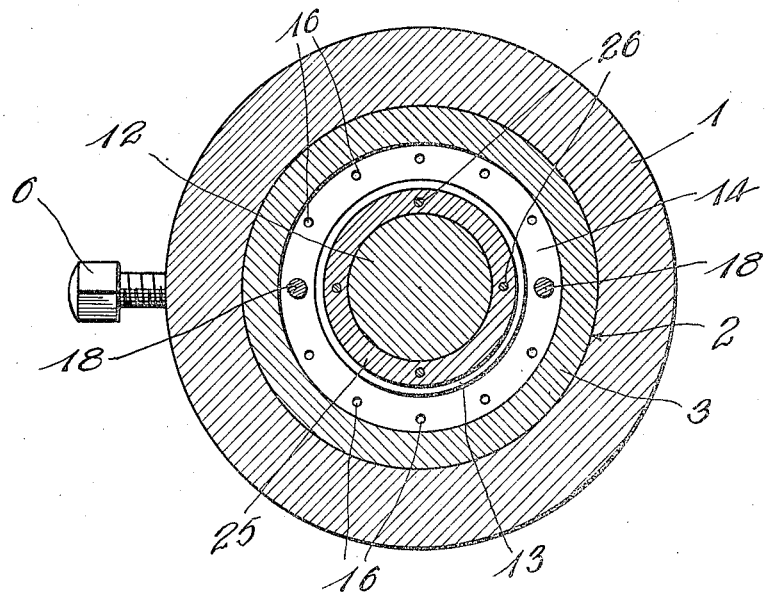
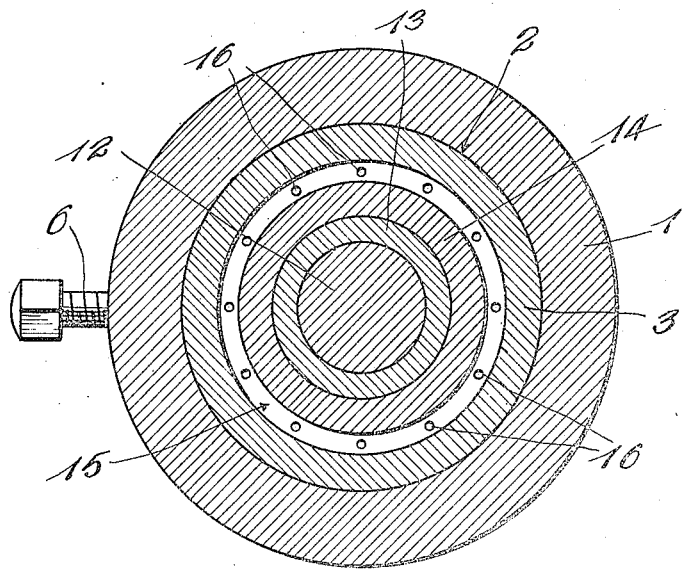

NORTON W. KINNEY, OF HAVERHILL, MASSACHUSETTS.

SELF-OILING METAL BEARING.

1,346,377.  Specification of Letters Patent.  Patented July 13, 1920.

Application filed June 19, 1919. Serial No. 305,414.

*To all whom it may concern:*

Be it known that I, NORTON W. KINNEY, citizen of the United States, residing at Haverhill, in the county of Essex and State of Massachusetts, have invented certain new and useful Improvements in Self-Oiling Metal Bearings; and I do declare the following to be a full, clear, and exact description of the invention, such as will enable others skilled in the art to which it appertains to make and use the same.

My invention has for its object to provide a bearing for high speed vertical spindles, constructed in a novel manner for effective lubrication and for adjustment to compensate for wear, proper positioning of the spindle, etc.

With the foregoing in view, the invention resides in the novel features of construction and unique association of parts hereinafter described and claimed, reference being made to the accompanying drawings.

Figure 1 is a vertical section of a bearing constructed in accordance with my invention.

Fig. 2 is a top plan view.

Fig. 3 is a horizontal section on the plane indicated by the line 3—3 of Fig. 1.

Fig. 4 is a similar view on the plane of line 4—4 of Fig. 1.

In the drawing above briefly described, the numeral 1 designates an outside shell which may be supported in any preferred manner, the bore 2 of said shell opening through both its upper and lower ends. A cylindrical cup 3 is snugly though slidably received in the shell 1 and rests on a flange 4 with which a vertical adjusting screw 5 is provided, said set screw being threaded into the lower end of said shell, so that by adjusting the screw in question, the cup may be vertically shifted within the shell. Set screws or the like 6 are provided for locking the cup 3 in adjusted position.

The bottom of the cup 3 is provided with a socket 7 into which a bearing disk 8 of any suitable metal is driven and held by friction, and an opening 9 may well be provided at the bottom of the socket for inserting a tool to remove said bearing disk when required. An anti-friction ball 10 rests on the disk 8 and is received in a concave 11 formed in the lower end of the vertical spindle 12. This spindle is provided with a downwardly tapered sleeve 13 which is rotatably received in the similarly tapered bore of a vertically adjustable bushing 14 which is in running contact with the wall of the cup 3. Between its ends, the bushing 14 is reduced in diameter to provide an external oil groove 15, and oil ports 16 lead into said groove from the upper and lower ends of the bushing.

A circular nut 17 is threaded in the upper end of the cup 3 around the spindle 12 and carries vertical set screws 18 which bear against the upper end of the bushing 14, while the reduced upper end 19 of another set screw 20 is received in a socket 21 in the lower end of said bushing for supporting the latter properly in the cup 3. The set screw 20 is threaded through the bottom of the cup and is provided with a locknut 22. By loosening the set screws 18 and tightening the screw 20, all wear between the sleeve 13 and the bushing 14 may be taken up and by then loosening the set screws 6 and tightening the screw 4, the cup 3 and the parts carried therein may be raised sufficiently to restore the spindle 12 to the exact position at which it was located before any wear occurred. After the correct adjustments are made, the screws 6 and 18, and the nut 22 are again tightened.

The sleeve 13 bears at its upper end against a shoulder 23 on the spindle 12 and is clamped against said shoulder by a nut 24 threaded on the lower end of said spindle, and a suitable washer 25 of fiber or the like is by preference located between the upper end of said sleeve and the nut 17, said nut and washer being preferably connected by vertical dowel pins 26.

Any suitable means may be provided for supplying oil to the cup 3, but I prefer to provide said cup with a port 37 into which piping 28 is threaded, said piping leading from an oil cup 29. A cock 30 may be provided in the bottom of the cup for draining the oil therefrom when necessary.

By constructing the bearing as shown and described, or approximately in this manner, it is highly efficient and desirable for high speed vertical spindles and the lubrication is of such efficiency as to practically prevent wear. The small wear that does take place is readily compensated for by the several adjustments described and in addition it will be seen that by loosening the screw 18 and threading the nut 17 farther into the cup 3, the washer 25 may at all times be held in contact with the upper end of the sleeve 13, thus insuring that leakage of oil shall not take place. The oil travels upwardly between the parts 13 and 14, by centrifugal force and returns through the openings 16. This circulation not only causes efficient lubrication, but prevents overheating both of the oil and the bearing.

Since probably the best results may be obtained from the details disclosed, they may well be followed, but within the scope of the invention as claimed, numerous minor changes may well be made.

I claim:

1. In a vertical spindle bearing, an outer shell, a vertical cup mounted in said shell for vertical adjustment, means for holding said cup in adjusted position, an anti-friction ball-bearing in the lower end of said cup, a vertical spindle resting on said ball-bearing, a downwardly tapered sleeve carried by said spindle, a bushing in said cup having a tapered bore rotatably receiving said tapered sleeve, means for raising said bushing to compensate for wear, a circular nut threaded in the upper end of said cup, and a set screw threaded through said nut and bearing against the upper end of said bushing to hold it tightly against said raising means.

2. In a vertical spindle bearing, an outer shell, a vertical cup mounted in said shell for vertical adjustment, means for holding said cup in adjusted position, an anti-friction ball-bearing in the lower end of said cup, a vertical spindle resting on said ball-bearing, a downwardly tapered sleeve carried by said spindle, a bushing in said cup having a tapered bore rotatably receiving said tapered sleeve, means for raising said bushing to compensate for wear, a circular nut threaded into the upper end of said cup, a washer carried by the lower side of said nut and contacting with the upper end of said sleeve, and a set screw threaded through said nut and bearing against the upper end of said bushing to clamp the same tightly against said raising means.

3. In a high speed bearing for vertical spindles, an outer shell having a vertical bore opening through both its upper and lower ends, a vertical cup mounted in said bore for vertical adjustment, screw means for adjusting said cup vertically and holding it in adjusted position, the bottom of said cup having a socket and a bearing disk frictionally held therein, a ball-bearing in said socket resting on said bearing disk, a vertical spindle having a concave lower end resting on said ball-bearing, a downwardly tapered sleeve secured on said spindle, a bushing received for vertical adjustment in said cup, a set screw threaded through the bottom of said cup and engaging said bushing for adjusting it vertically, a circular nut threaded into the upper end of said sleeve, and a set screw threaded through said nut and bearing against the upper end of said bushing to hold the latter tightly against said first named set screw, said bushing being decreased in diameter between its ends to form an oil groove and having ports leading into said groove from said ends.

In testimony whereof I have hereunto set my hand.

NORTON W. KINNEY.